US010108524B2

(12) United States Patent
Scheuer et al.

(10) Patent No.: US 10,108,524 B2
(45) Date of Patent: *Oct. 23, 2018

(54) RECORDING CPU TIME FOR SAMPLE OF COMPUTING THREAD BASED ON CPU USE STATE OF ACTIVITY ASSOCIATED WITH THE SAMPLE

(71) Applicant: SAP SE, Walldorf (DE)

(72) Inventors: Tobias Scheuer, Bruchsal (DE); Daniel Booss, Wiesloch (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/489,208

(22) Filed: Apr. 17, 2017

(65) Prior Publication Data

US 2017/0220446 A1  Aug. 3, 2017

Related U.S. Application Data

(63) Continuation of application No. 14/660,591, filed on Mar. 17, 2015, now Pat. No. 9,632,902.

(60) Provisional application No. 62/091,074, filed on Dec. 12, 2014.

(51) Int. Cl.
*G06F 9/46* (2006.01)
*G06F 11/34* (2006.01)
*G06F 11/32* (2006.01)
*G06F 11/07* (2006.01)
*G06F 11/22* (2006.01)

(52) U.S. Cl.
CPC ............ *G06F 11/3423* (2013.01); *G06F 9/46* (2013.01); *G06F 11/0766* (2013.01); *G06F 11/2236* (2013.01); *G06F 11/328* (2013.01); *G06F 11/3409* (2013.01); *G06F 11/3466* (2013.01); *G06F 11/3476* (2013.01); *G06F 11/3452* (2013.01); *G06F 2201/86* (2013.01); *G06F 2201/865* (2013.01); *G06F 2201/88* (2013.01)

(58) Field of Classification Search
None
See application file for complete search history.

(56) References Cited

U.S. PATENT DOCUMENTS 8,458,716 B2   6/2013  Altrichter et al.
2009/0187784 A1   7/2009  Bernardi et al.

*Primary Examiner* — Gregory A Kessler
(74) *Attorney, Agent, or Firm* — Mintz Levin Cohn Ferris Glovsky and Popeo, P.C.

(57) ABSTRACT

Computing threads can be sampled such that the samples hit each activity with a probability proportional to a time period of that activity. Therefore, the sampling can advantageously account for all activities, including activities that are smaller than the applicable sampling interval.

20 Claims, 18 Drawing Sheets

RECORDING CPU TIME FOR SAMPLE OF COMPUTING THREAD BASED ON CPU USE STATE OF ACTIVITY ASSOCIATED WITH THE SAMPLE

CROSS REFERENCE

This patent application claims priority to and is a continuation of U.S. patent application Ser. No. 14/660,591, filed on Mar. 17, 2015, entitled "Recording CPU Time for Sample of Computing Thread Based on CPU Use State Of Activity Associated With the Sample", which claims priority to U.S. Patent Application Ser. No. 62/091,074 filed on Dec. 12, 2014, entitled "Advanced Rebooking of Sample Measurement for Profiling Applications". The contents of the above-referred patent applications are incorporated by reference herewith in their entireties.

TECHNICAL FIELD

The subject matter described herein relates to recording CPU time for a sample of a computing thread based on a CPU use state (for example, wait state or active state) of an activity (for example, a subroutine) associated with the sample.

BACKGROUND

A computer program typically includes multiple computing threads, each of which can include one or more activities. An activity can also be referred to as a subroutine, a function, or a function call. An activity, which when executed, can also call another activity. A call stack is a stack data structure conventionally stores information about activities of a thread of the computer program. Each activity has a corresponding stack frame (in the call stack), which stores data for that activity.

To obtain data of a thread with multiple activities at various times, developers usually sample a thread and store data associated with each sample in a call stack associated with the thread. In one example, a developer can sample a thread every millisecond to generate 1000 samples per second, and each activity can span for time typically ranging from microsecond(s) to millisecond(s). Thus, two consecutive samples can encompass portions of one or more activities.

The retrieving and storing of data for each sample of the computing thread is now described. For each sample, a total CPU time is retrieved from the operating system and recorded in the call stack. This total CPU time has been used conventionally to determine hot spots (that is, specific portions of the computer program that use a large amount of the CPU time). However, these traditionally determined hot spots are usually inaccurate, as the total CPU time retrieved from the operating system is not a good indicator of a total time for which the CPU has been servicing. This total CPU time is not a good indicator because CPUs often go in wait states, which are time periods when the CPUs do not service activities of a computer program, and such wait state time periods are not accounted for in the total CPU time. Due to this inaccurate determining of hot spots, developers spend undesirably high amounts of time examining various portions of the code that are already efficient and would not have required examination had there been a more accurate determination of hot spots.

SUMMARY

In one aspect, a computer thread is received that characterizes a portion of a plurality of activities of a computer program. The plurality of activities associated with the computing thread can also be identified. The computing thread is sample to generate a plurality of samples such that a probability of at least one sample being taken within each activity is proportional to a time period of the activity. A time period is obtained for each sample from an operation system. The time period is associated with a central processing unit (CPU) and is operatively coupled to at least one data processor. It is then determined that a sample indicates an activity that is not serviced by the CPU. The time period for the sample associated with the activity that is not serviced by the CPU is recorded in a stack frame specific to a prior sample that indicates a prior activity that was serviced by the CPU. Data stored in the stack frame specific to the prior sample is then provided.

The providing can include generating a summary report that includes the time period recorded for the prior activity, identification of the prior activity, and a total number of samples for which time periods associated with the CPU are recorded in stack frames of prior samples. The summary report can be displayed on a graphical user interface operatively coupled to the at least one processor.

It can be determined that another sample indicates another activity that is serviced by the CPU. The time period can then be recorded for the another sample that indicates that the another activity is in another stack frame specific to the another sample. The stack frame can be specific to the prior sample and the stack frame specific to the another sample being a part of a call stack for the computing thread. Data stored in the another stack frame can be provided to the another sample. Providing of the data stored in the another stack frame specific to the another sample can include generating a summary report. The summary report can include the time period recorded for the another activity, identification of the another activity, and a total number of samples for which time periods associated with the CPU are recorded in stack frames of prior samples. The summary report can be displayed on a graphical user interface operatively coupled to the at least one processor.

The computer program can execute an enterprise resource planning application. Each activity of the computer program can be a subroutine of the computer program.

The subject matter described herein can offer many advantages. For example, the sampling described herein can sample a computing thread such that the samples hit each activity with a probability proportional to a time period of that activity. Therefore, the sampling can advantageously account for all activities, including activities that are smaller than the applicable sampling interval. Additionally, the system described herein can record data regarding the samples in a call stack of the computing thread based on a CPU state (for example, an actively servicing state when the CPU serves activities of a computing thread, or a wait state when the CPU is unavailable to serve activities). Such a recording based on the CPU state can advantageously enable an accurate determination of hot spots. Once the hot spots have been accurately identified within a computer program, a developer can quickly modify selective portions of the computing program based on the hot spots without wasting time on examining portions of the computer code that do not need to be examined.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description, drawings, and the claims.

DETAILED DESCRIPTION

Figure 1:
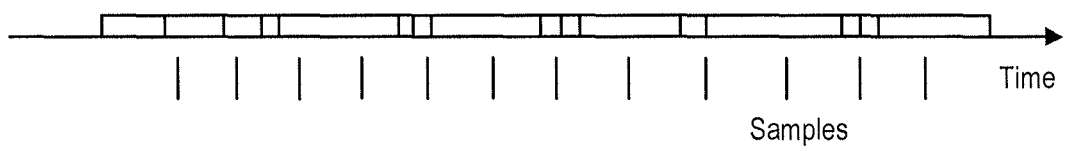
FIG. 1 illustrates sampling over time of activities of a computing thread that have an irregular pattern.

FIG. 1 illustrates sampling over time of activities (shown as blocks) of a computing thread that have an irregular pattern. The samples generated by the sampling are shown as lines below the activities. Each activity (shown as a block) is a part of a computing thread, and can run between a start time and an end time of the computing thread. Some activities may not have any separate sample associated with them.

Figure 2:
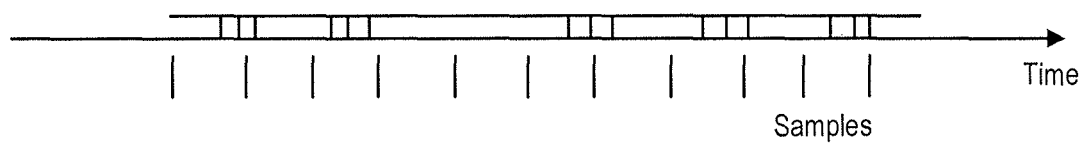
FIG. 2 illustrates sampling over time of activities of a computing thread that have a regular pattern.

FIG. 2 illustrates sampling over time of activities (shown as blocks) of a computing thread that have a regular pattern. The samples generated by the sampling are shown as lines below the activities.

Figure 3:
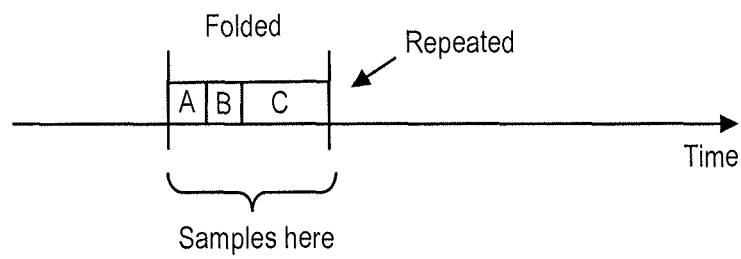
FIG. 3 illustrates an example used to show a method of sampling a computing thread with a regular pattern and a subsequent method of recording data associated with each sample.

FIG. 3 illustrates an example used to show a method of sampling a computing thread with a regular pattern (which can be similar to the regular pattern of FIG. 2) and a subsequent method of recording data associated with each sample.

The method of sampling is now described. The sampling performed here can generate samples (which are shown as lines in FIGS. 1 and 2, but are not shown in FIG. 3) such that the likelihood of an activity (shown as blocks) being associated with at least one sample is proportional to a time period of that activity. For example, the likelihood of each activity A, B, or C being associated with at least one sample can be proportional to a time period or length of that activity. Such a sampling can advantageously account for all activities, including activities that are smaller than the sampling interval. When the activities are smaller than the sampling interval, there can be two or more different activities between two consecutive samples.

The recording of data associated with each sample in the call stack of the computing thread is now described. In a first scenario, consider that all activities of the computing thread are serviced by the CPU throughout the time periods of those activities. Under this scenario, the activity of the current sample can be assigned a time measured since the last sample during sampling. This time can be recorded in the call stack. Every measurement between two samples can roughly measure the same amount of CPU time. The distribution according to the random sample locations can indicate the correct amounts of CPU time being recorded for each activity.

In a second scenario (which may occur more often than the first scenario noted above), consider that one activity of the activities does not use the CPU and the computing thread is in a wait state for that activity. As an example for this second scenario, consider that: activity A and activity B each have a length that is one quarter of the length of the pattern ABC (as shown), activity A and activity B each use the CPU, activity C has a length that is one half of the length of the pattern interval ABC (as shown), and activity C does not use the CPU (that is, CPU is in a wait state). If the conventional sampling and recording techniques were followed, the CPU time would have been inaccurately distributed half to activity C and one quarter each to activities A and B. However, with the currently described techniques for sampling and recording, activity C accurately may not get any CPU time (or gets minimal CPU time) while activities A and B get an equal amount of significant CPU time.

The current technique of recording is performed as described below with the help of the example shown in FIG. 3 and described above. When a sample is in activity A or activity B, that activity can be recorded in the call-stack of the computing thread. When a sample is in activity C, which has been determined to not use the CPU, the CPU time can be recorded in the call stack but may not be assigned to any activity. (If required, the recordings mentioning the unassigned time can later be disregarded, as they do not provide significantly meaningful information.) Therefore, until now, a lot of time can be recorded as unassigned, no time is recorded for activity C, a quarter of all times is recorded for each of activities A and B.

Data for a subsequent sample can be recorded in the call stack based on a CPU state of an activity under which the sample lies, as explained below. For this example, when this subsequent sample is in activity C, the previous sample is required to be in one of activities A, B and C. If the previous sample was in activity A or activity B, the CPU time can be recorded for one of activity A and activity B. If the last sample was in activity C, then the sample immediately prior to the previous sample can be used. If this immediately prior sample was in activity A or activity B, the CPU time can be recorded for one of activity A and activity B. If the immediately prior sample was in activity C, then the sample further immediately prior to the prior sample can be used. If none of the previous sample, the immediately prior sample, and the further immediately prior sample is one of activity A and activity B, further previous samples can be determined a predetermined number of times (for example, eight times) until one of activity A and activity B are reached. If activity A or activity B are not reached within these predetermined number (for example, eight) of attempts, the CPU time is recorded as unassigned.

If a previous sample was in activity A or activity B with equal probability, the measured CPU time can be recorded for activity A and activity B equally.

In view of the above, the measured CPU times are recorded in activities A and B in a statistically evenly distributed manner. Not much time may go into "unassigned," as the predetermined number (for example, eight) is usually high enough to reach to activities A or B within the predetermined number (for example, eight) of attempts after a sample fall under activity C.

The technique described above is also effective when activity A and activity B have different sizes.

In some cases, the above-described technique may not account correctly if the activity C does have a CPU time (even despite the activity C being marked as inactive or waiting). This is a systematic error that can sometimes be made, and the boundaries of the inactive marking can be easily set precisely enough for some technical reasons. In some cases, this inactivity mark can be pushed into a Linux kernel so that the measurement is correspondingly precise. Stated differently, this error can be turned into a feature as described below.

This arrangement can give rise to another consideration. If there is in fact some CPU time contained in activity C, then this amount of CPU time can be rebooked to activity A and activity B. This means that in the end, activity A and activity B can appear slightly larger in terms of CPU time used than they would be with correct numbers. The samples that have CPU can lead to measurements which are good, and the other samples point to other code locations which the developer should examine. This arrangement can lead the developer to consider other potentially slow parts of the code.

After this process, a summary can be generated that can include: CPU times recorded for activities (for example, activities A and B) associated with prior sample(s), identification (for example, activities A and B) of activities associated with those prior sample(s), and a total number of sample(s) for which CPU times are recorded under prior sample(s). The summary can be in the form of a document, a report, or any other collection of the data included within the summary. The summary exposes and quantifies the hot spots in the computer program (that is, portions of the programming code that are slow). Therefore, the sampling and recording techniques described herein can cure the problem of inaccurate determination of hot spots by conventional recording techniques that record data for each sample regardless of the CPU state of activity for the sample.

Figure 3A:
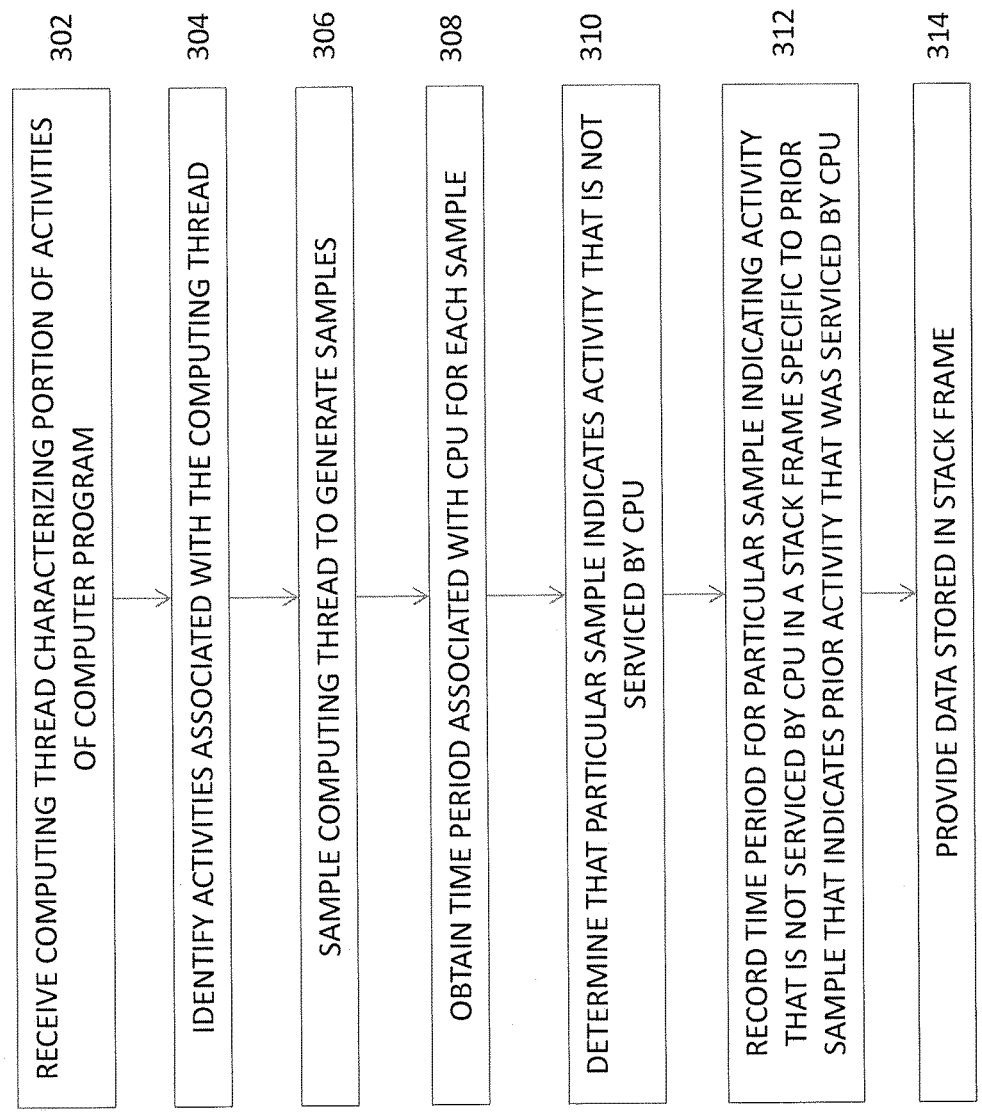
FIG. 3A is a flow diagram illustrating a process of sampling a computing thread with a regular pattern and a subsequent method of recording data associated with each sample.
Figure 4A:
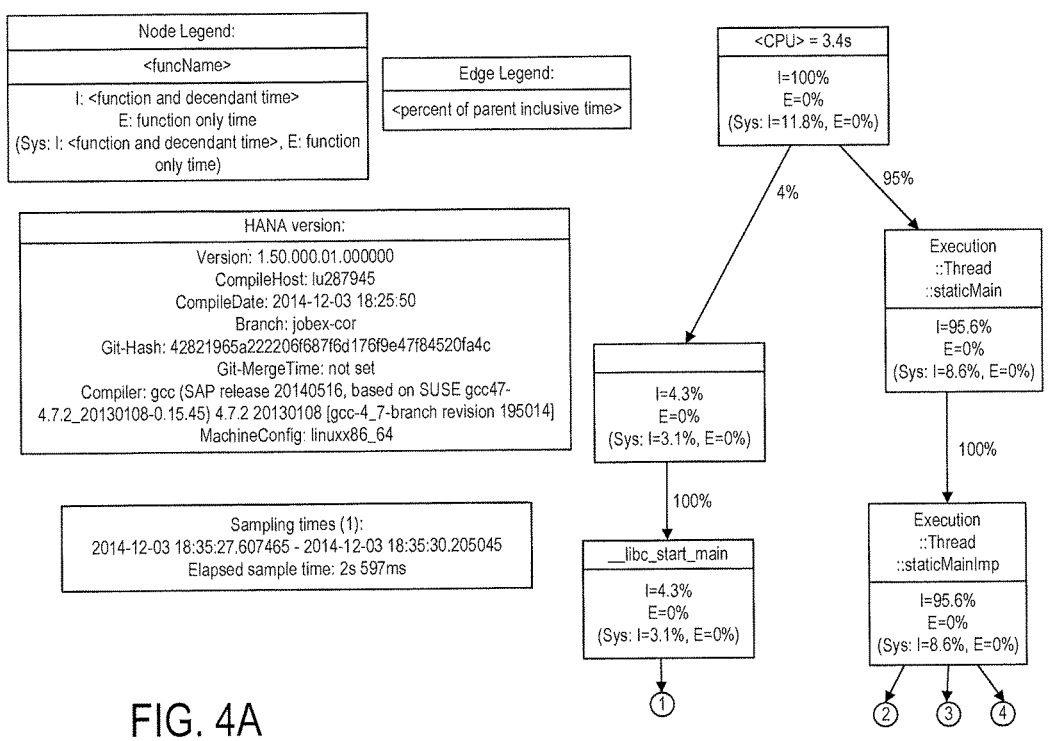
FIGS. 4A-4E are diagrams illustrating a database profile for booking of profile measurements.
Figure 4B:
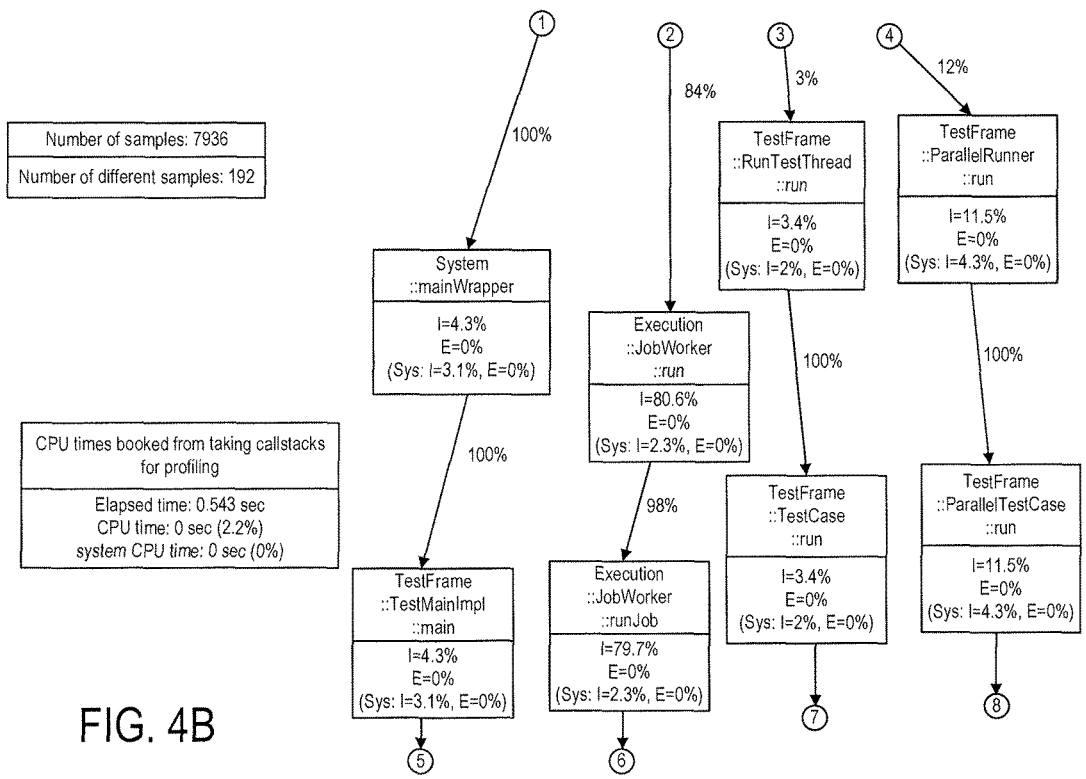
Figure 4C:
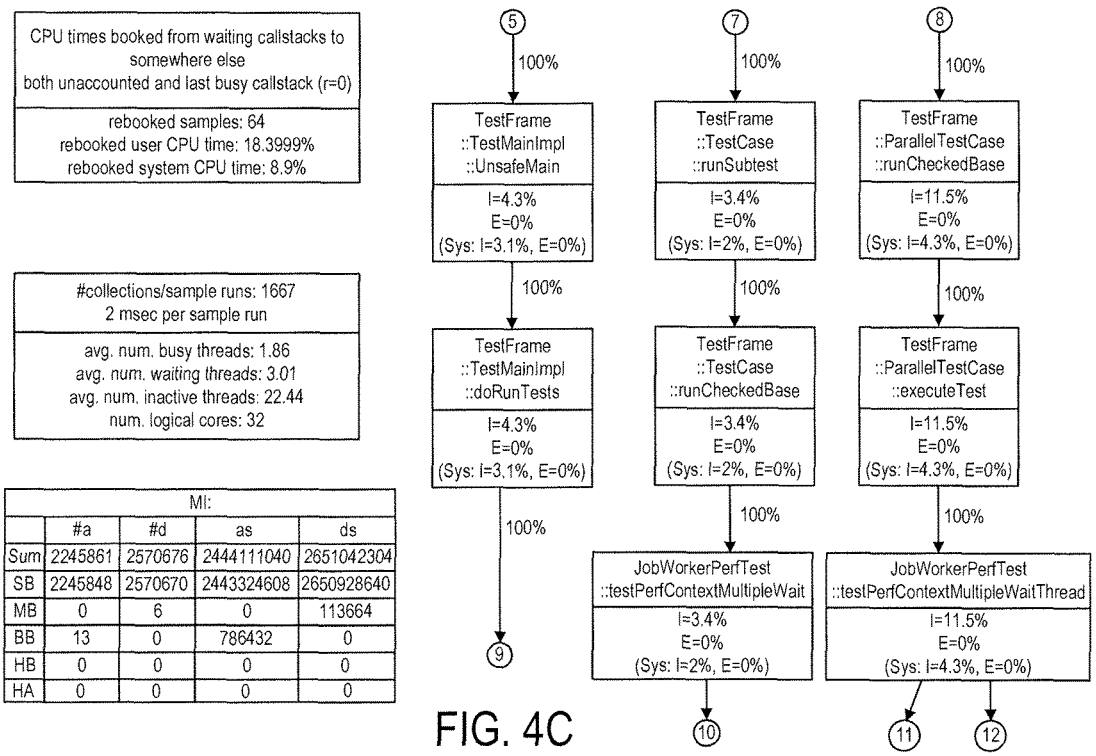
Figure 4D:
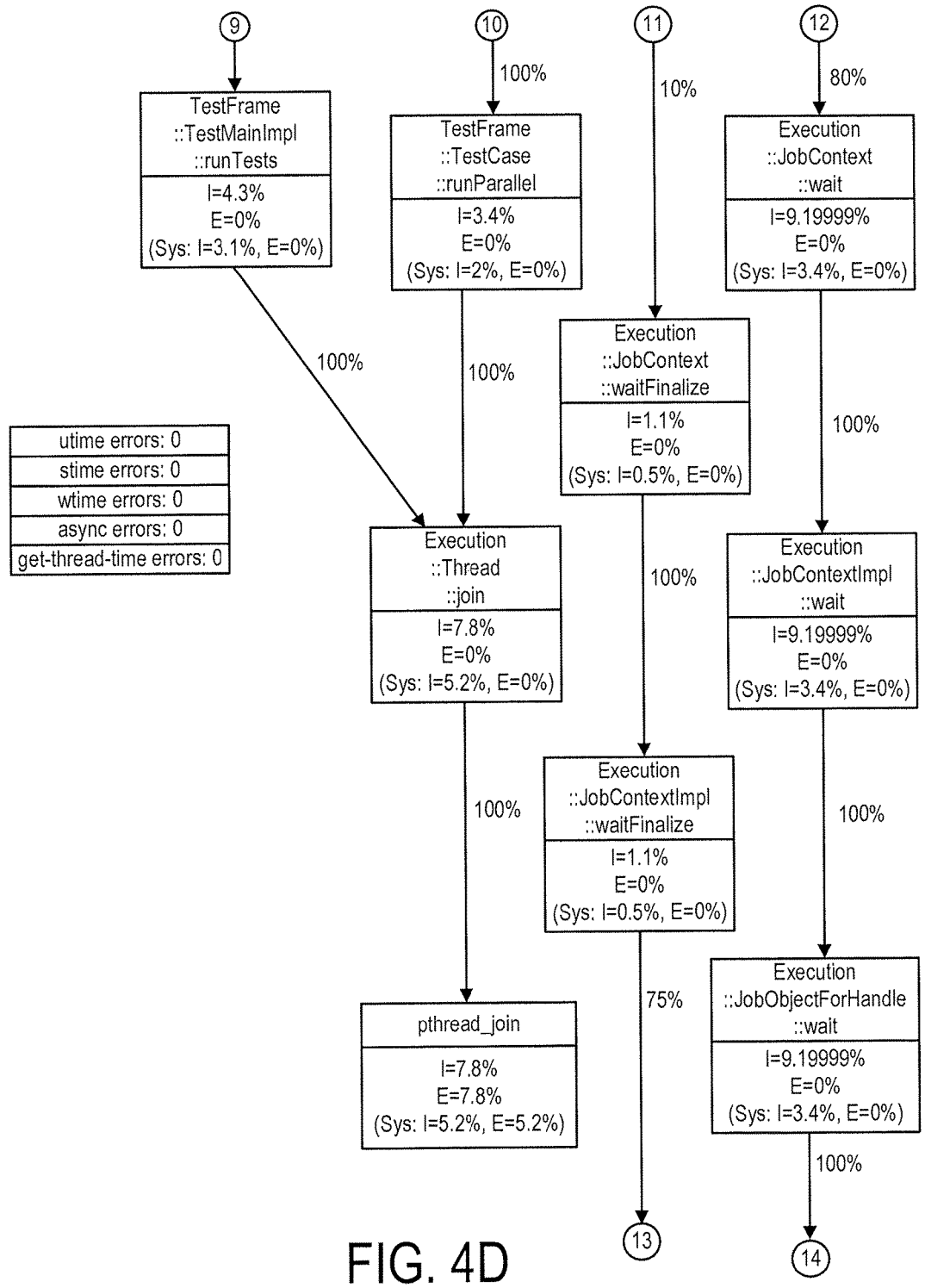
Figure 4E:
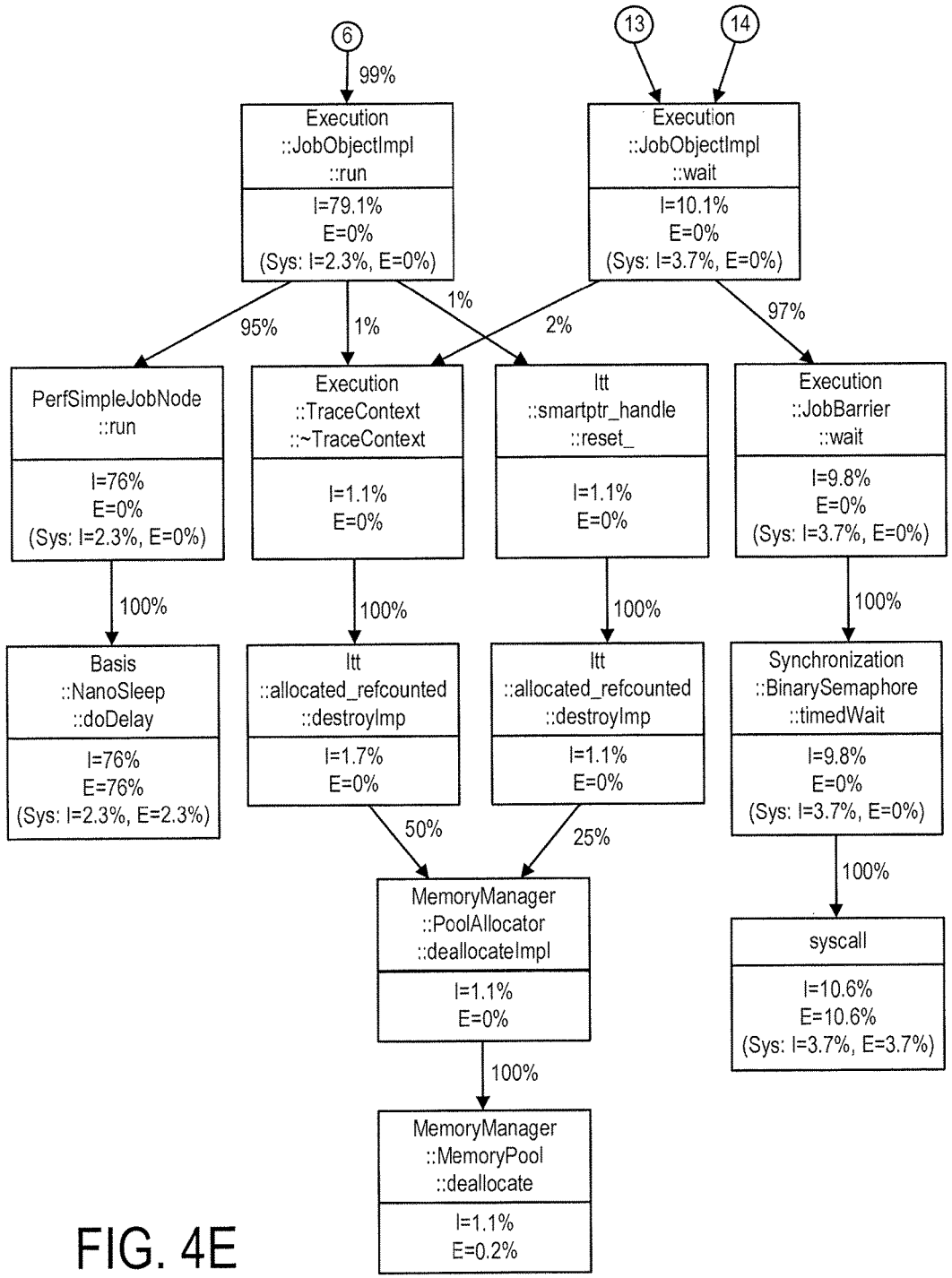

FIG. 3A is a flow diagram illustrating a process of sampling a computing thread with a regular pattern and a subsequent method of recording data associated with each sample.

At least one processor can receive, at 302, a computing thread characterizing a portion of a plurality of activities of a computer program. The at least one processor can identify, at 304, the plurality of activities associated with the computing thread. The at least one processor can sample, at 306, the computing thread to generate a plurality of samples. A probability of at least one sample being taken within each activity can be proportional to a time period of the activity. The at least one processor can obtain, at 308 and from an operating system operatively coupled to the processor and for each sample, a time period associated with a central processing unit (CPU) operatively coupled to the at least one processor. The at least one processor can determine, at 310, that a sample indicates an activity that is not serviced by the CPU. The at least one data processor can record, at 312, the time period for the sample indicating the activity that is not serviced by the CPU in a stack frame specific to a prior sample that indicates a prior activity that was serviced by the CPU. The at least one processor can provide, at 314, data stored in the stack frame specific to the prior sample.

The providing at 314 can include: generating a summary report comprising: the time period recorded for the prior activity, identification of the prior activity, and a total number of samples for which time periods associated with the CPU are recorded in stack frames of prior samples; and displaying the summary report on a graphical user interface operatively coupled to the at least one processor.

The at least one processor can determining that another sample indicates another activity that is serviced by the CPU. The at least one processor can record the time period for the another sample indicating the another activity in another stack frame specific to the another sample. The stack frame specific to the prior sample and the stack frame specific to the another sample can be a part of a single call stack for the computing thread. The at least one processor can provide data stored in the another stack frame specific to the another sample. This providing can include: generating a summary report comprising: the time period recorded for the another activity, identification of the another activity, and a total number of samples for which time periods associated with the CPU are recorded in stack frames of prior samples; and displaying the summary report on a graphical user interface operatively coupled to the at least one processor.

The computer program can execute an enterprise resource planning application. Each activity of the computer program is a subroutine of the computer program.

Figure 5A:
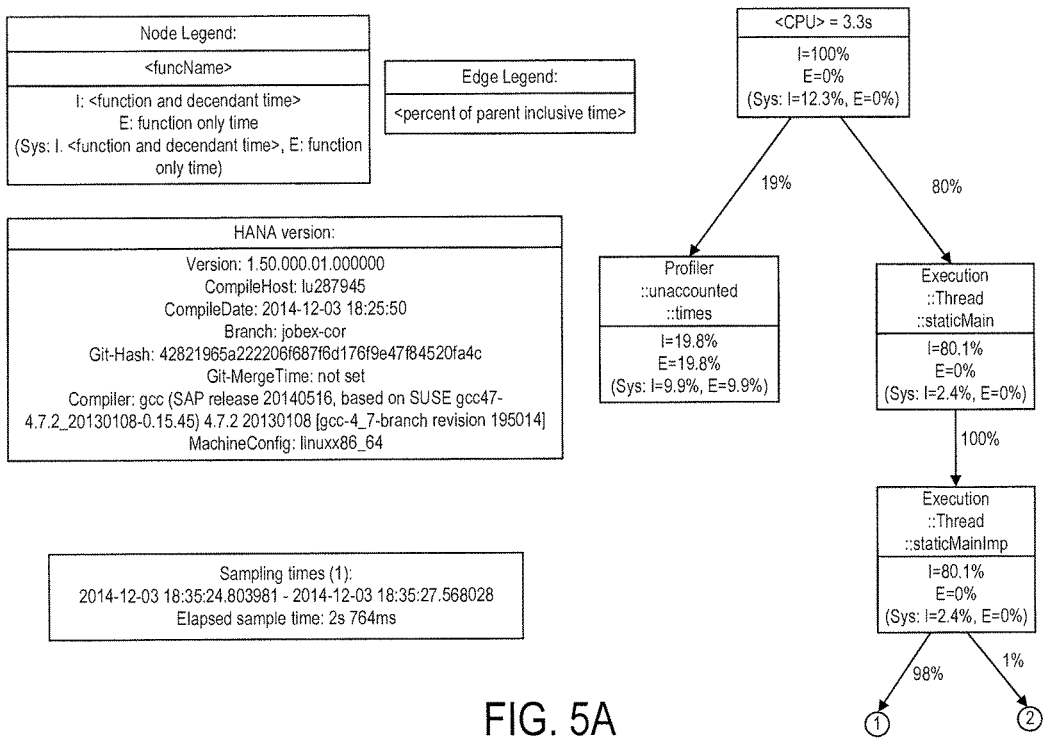
FIGS. 5A-5C are diagrams illustrating a database profile for accounting of unassigned activities.
Figure 5B:
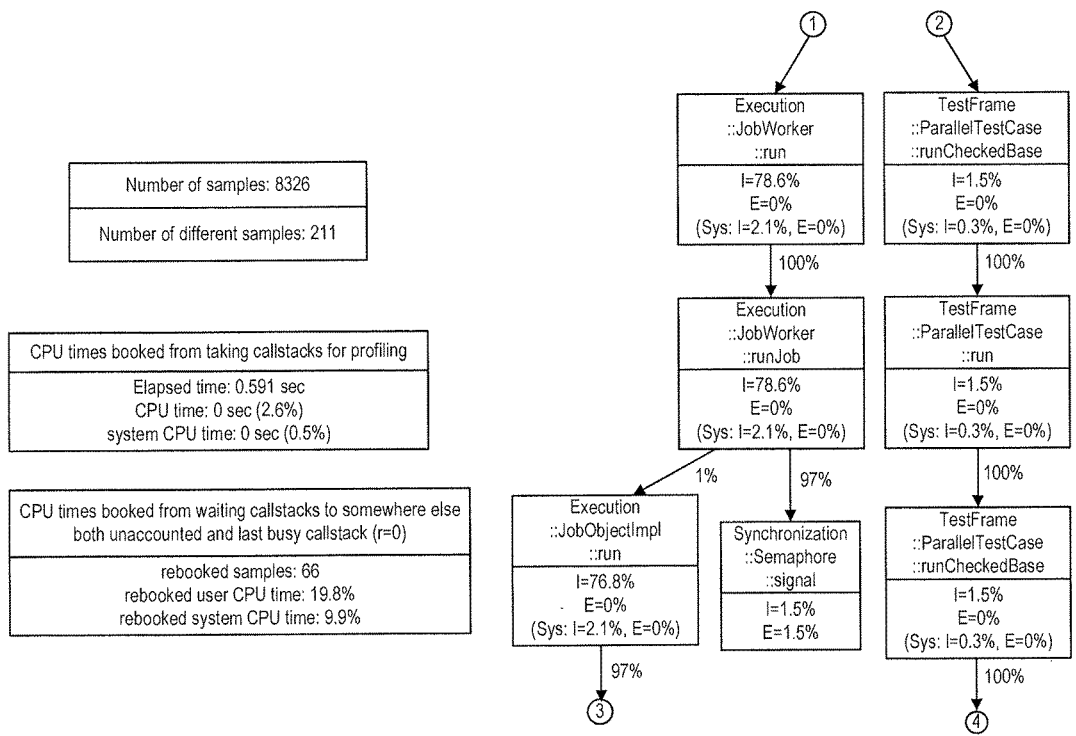
Figure 5C:
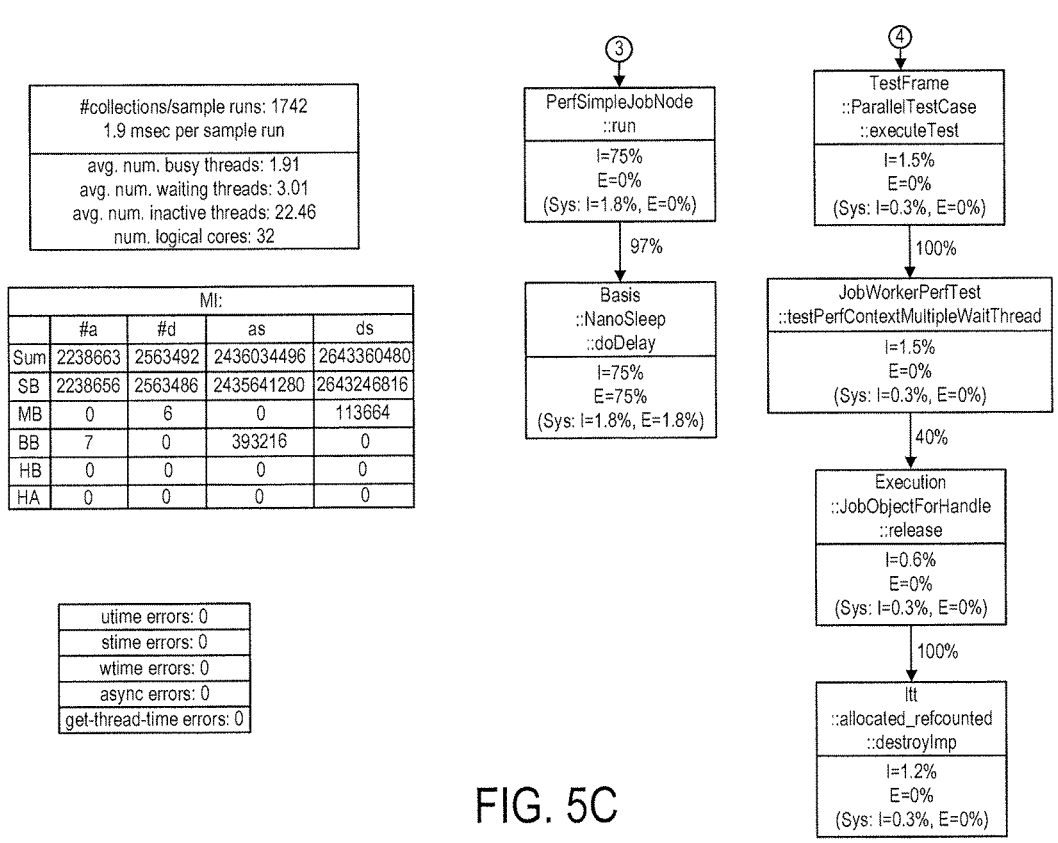
Figure 6A:
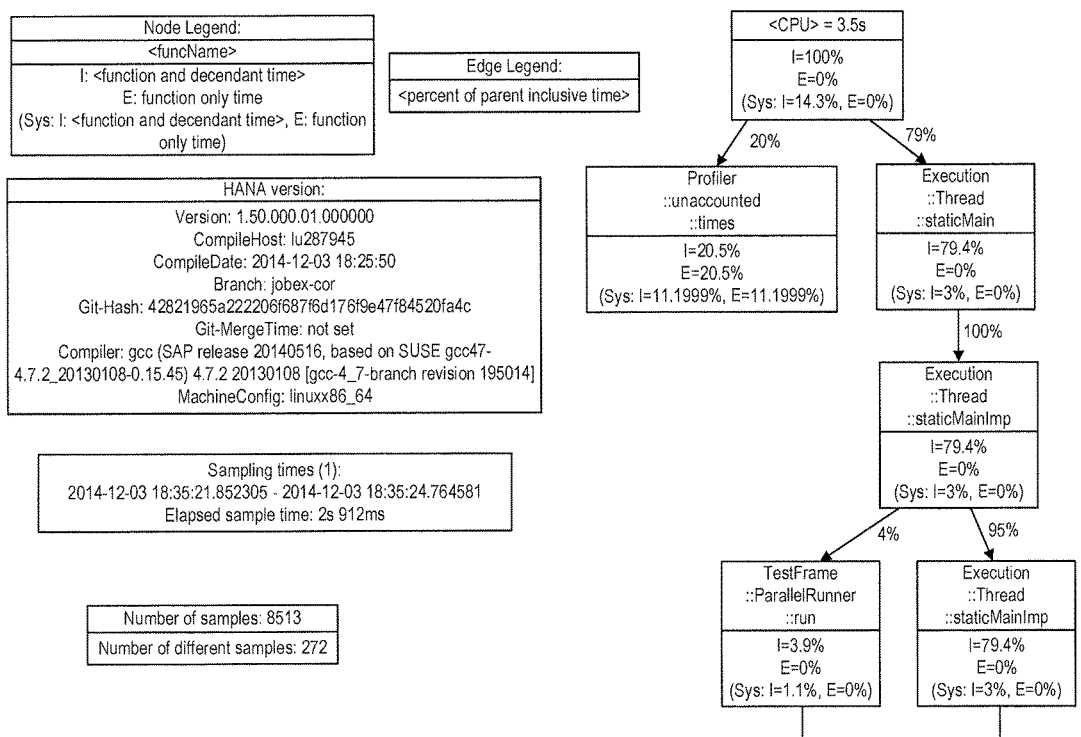
FIGS. 6A-6D are diagrams illustrating a database profile for accounting using a last sample.
Figure 6B:
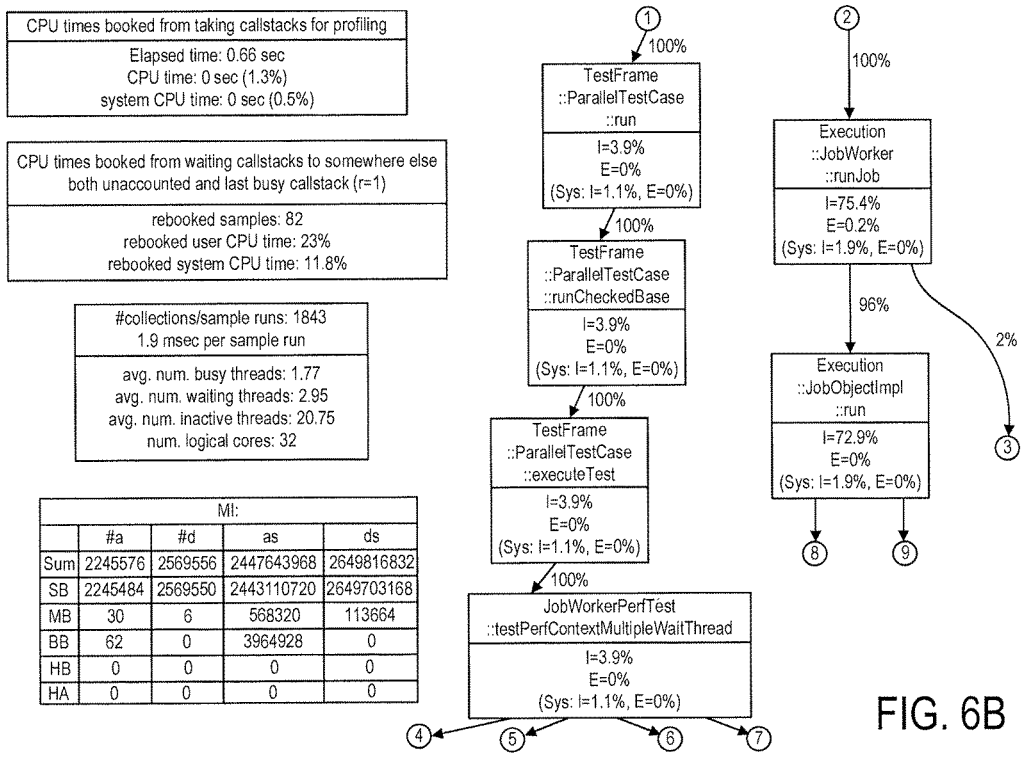
Figure 6C:
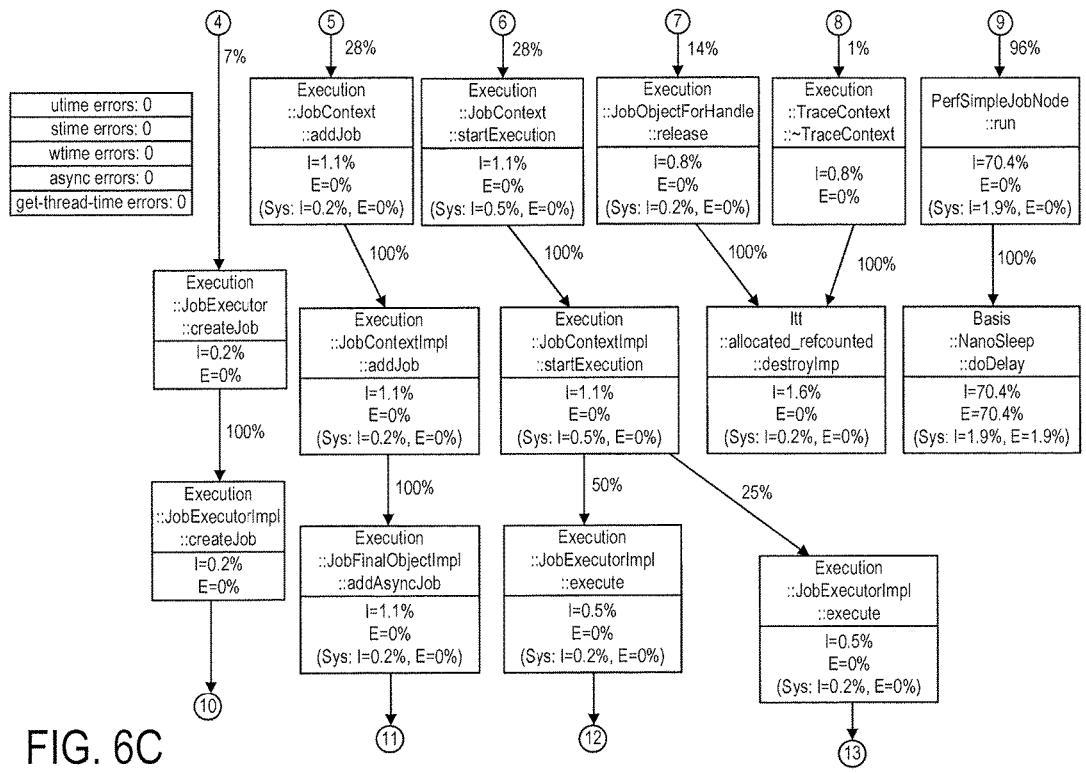
Figure 6D:
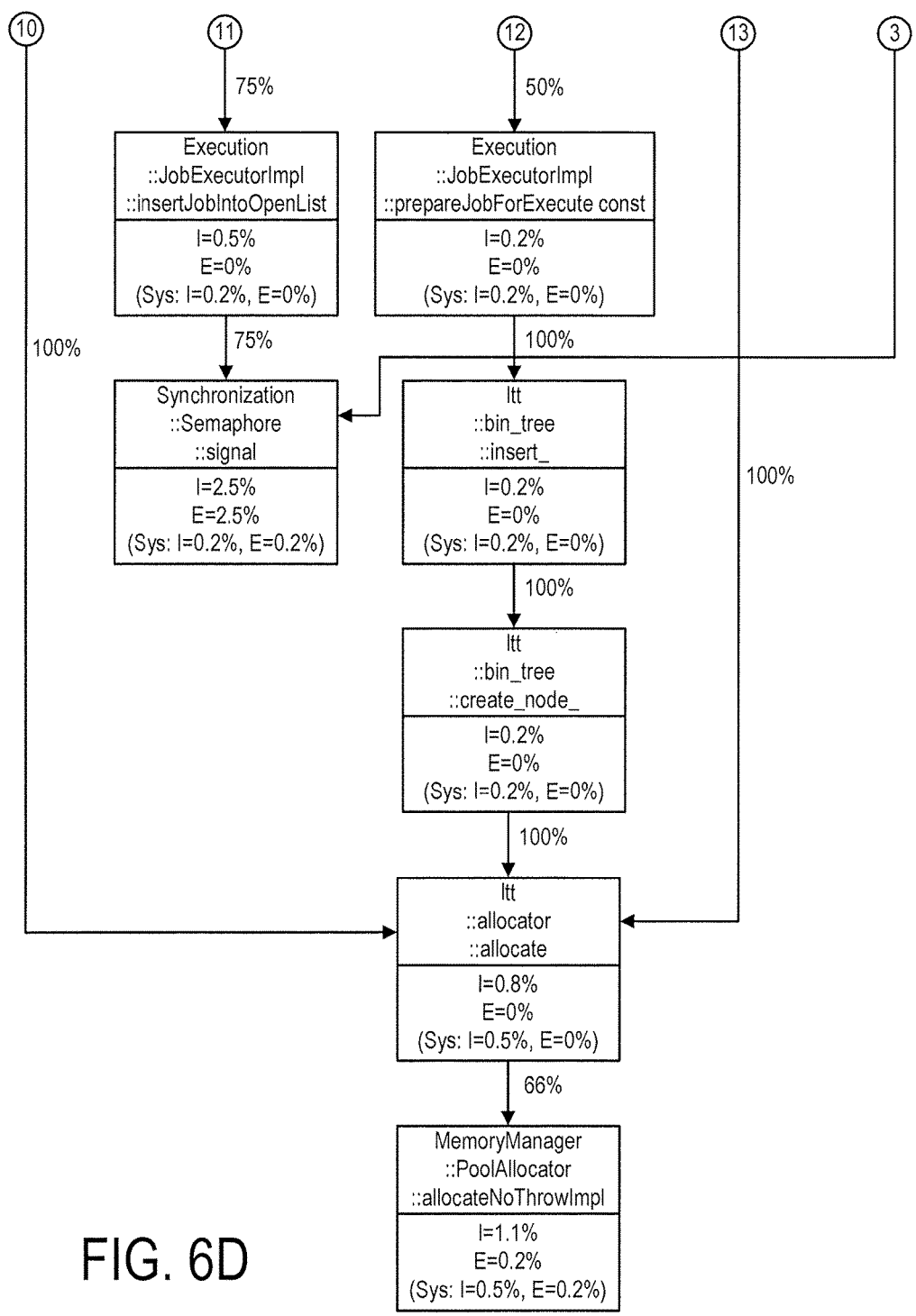
Figure 7A:
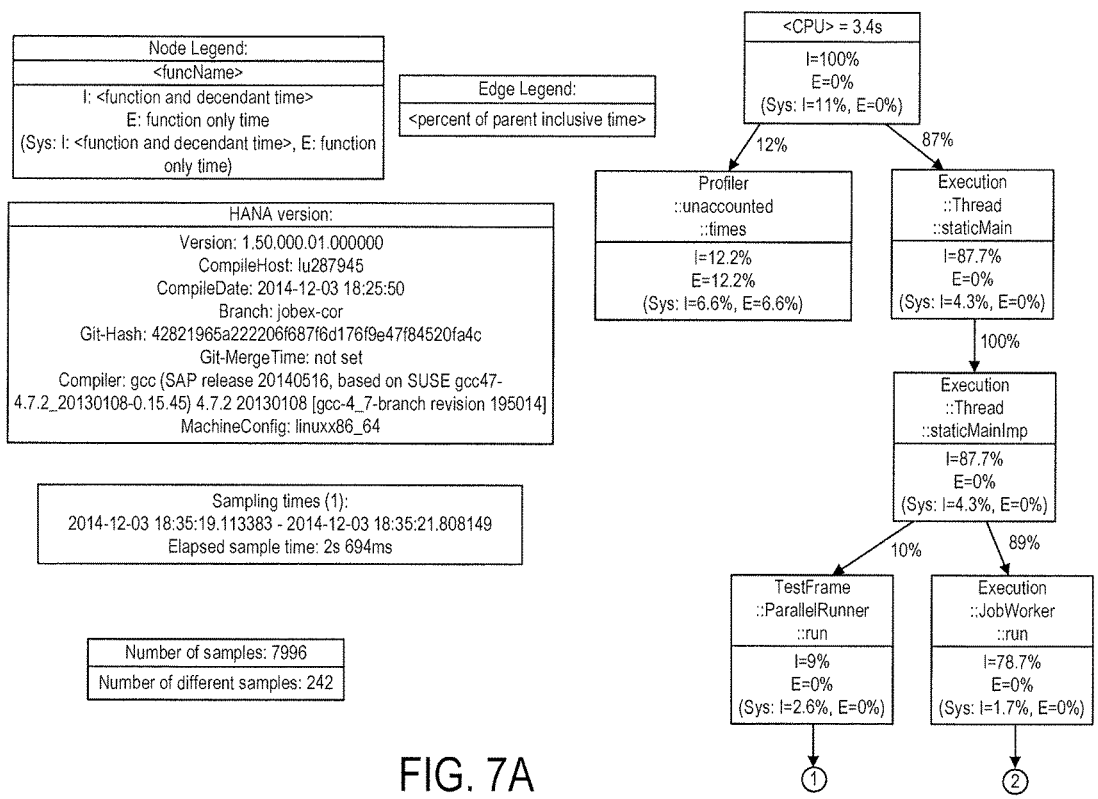
FIGS. 7A-7D are diagrams illustrating a database profile for accounting using a last sample eight times.
Figure 7B:
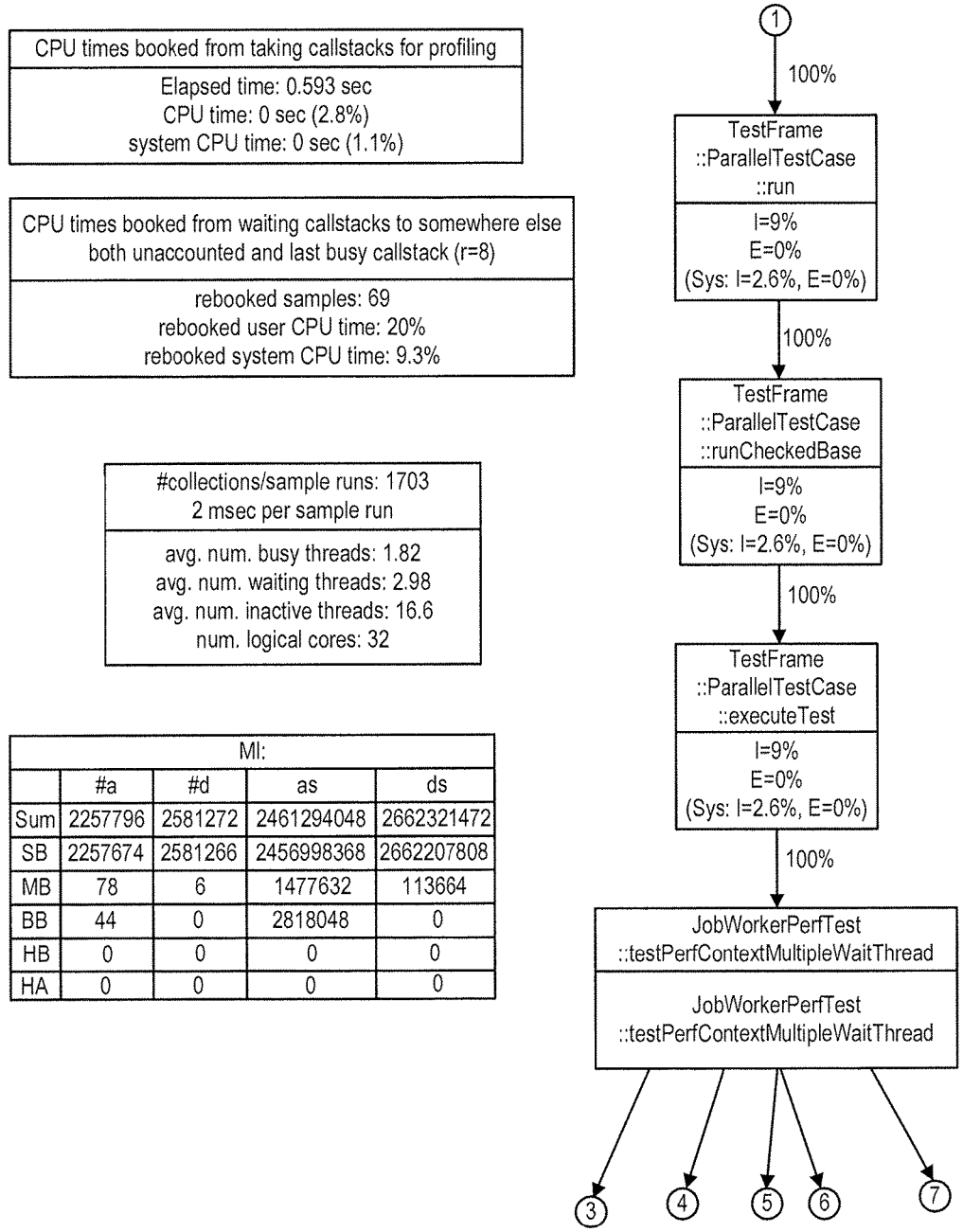
Figure 7C:
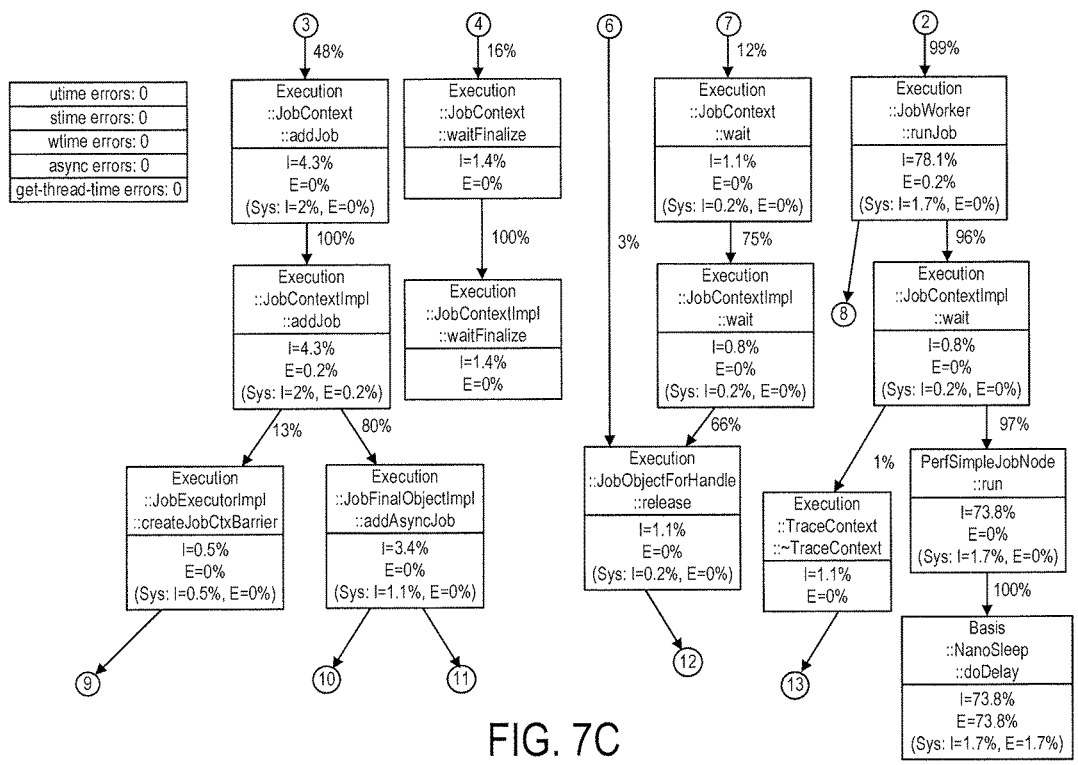
Figure 7D:
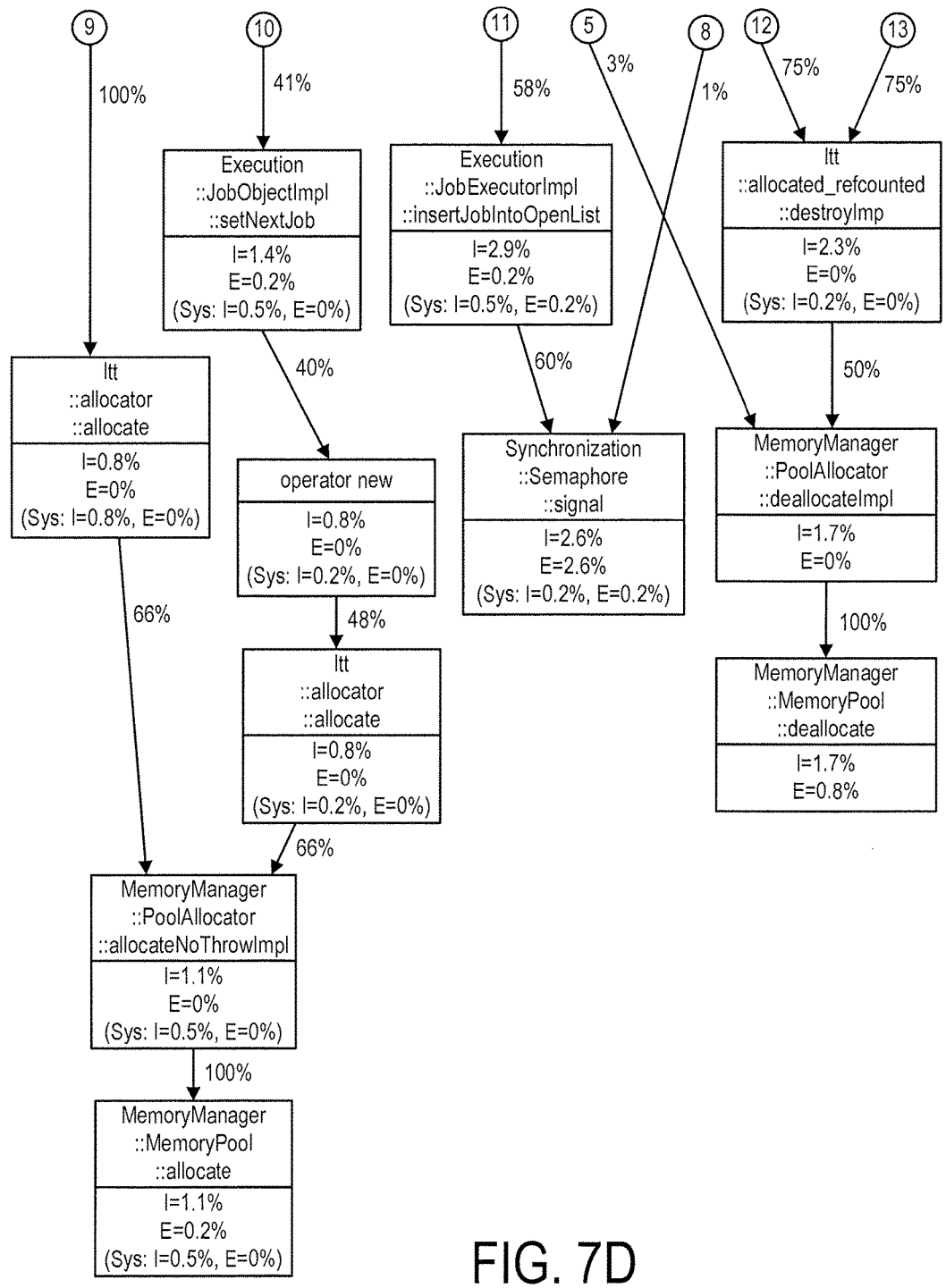

Four profiles are provided herein that can be used, for example, by a database such as the HANA database platform provided by SAP SE. It will be appreciated that such profiles are examples only and that other types of profiles can be used within the database (e.g., HANA database) for the purpose of performance diagnostics. A first profile is illustrated in FIGS. 4A-4E and illustrates one technique for booking sampling measurements. A second profile is illustrated in FIGS. 5A-5C and only relates to a first step, accounting on "unassigned". A third profile is illustrated in FIGS. 6A-6E and illustrates the use of a last sample once. A fourth profile is illustrated in FIGS. 7A-7D and illustrates the repeated use of a last sample (in this case eight times). The examples in FIGS. 5A-7D are complete callstacks, so each of the rectangles is both a code activity that was sampled, like A B C above, and a parent/caller of such an activity.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." Further there can be dozens to hundreds of activities and so references such as A, B, and C are just labels of subsets/potential subsets of activities. A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claim.

What is claimed is:

1. A method comprising:
    determining, by at least one processor, that a sample of a plurality of samples indicates a particular subroutine of a plurality of subroutines that is not being serviced for a particular time period by a central processing unit operatively coupled to the at least one processor, the plurality of samples being associated with a computing thread characterizing a portion of the plurality of subroutines;
    recording, by the at least one data processor, the particular time period in a stack frame specific to a prior sample of the plurality of samples, the prior sample indicating a prior subroutine of the plurality of subroutines that was serviced by the central processing unit; and
    retrieving, by the at least one processor, the particular time period from the stack frame to generate a report.

2. The method of claim 1, wherein a probability of at least one sample of the plurality of samples being taken within each subroutine of the plurality of subroutines is proportional to a time period of the subroutine.

3. The method of claim 1, wherein the plurality of subroutines is a part of a computer program that executes an enterprise resource planning application.

4. The method of claim 1, wherein each subroutine of the plurality of subroutines is a function call within a computer program.

5. The method of claim 1, further comprising:
    receiving, by the at least one processor, the computing thread prior to the determining that the sample indicates the particular subroutine that is not serviced by the central processing unit.

6. The method of claim 1, wherein the report comprises the particular subroutine, an identification of the prior subroutine, and a total number of samples for which time periods associated with the central processing unit are recorded in stack frames of prior samples.

7. The method of claim 1, further comprising:
    displaying, by the at least one processor, the report on a graphical user interface.

8. The method of claim 1, wherein the stack frame is a first data structure that stores data associated with the prior subroutine, the stack frame being a part of a call stack, the call stack being a second data structure that stores data associated with the computing thread.

9. A non-transitory computer program product storing instructions that, when executed by at least one programmable processor, cause the at least one programmable processor to perform operations comprising:
    determining that a sample of a plurality of samples associated with a computing thread characterizing a portion of a plurality of subroutines indicates a particular subroutine of the plurality of subroutines that is not being serviced for a particular time period by a central processing unit operatively coupled to the at least one processor;
    recording the particular time period in a stack frame specific to a prior sample of the plurality of samples, the prior sample indicating a prior subroutine of the plurality of subroutines that was serviced by the central processing unit; and retrieving the particular time period from the stack frame to generate a report.

10. The non-transitory computer program product of claim 9, wherein a probability of at least one sample of the plurality of samples being taken within each subroutine of the plurality of subroutines is proportional to a time period of the subroutine.

11. The non-transitory computer program product of claim 10, wherein the plurality of subroutines is a part of a computer program that executes an enterprise resource planning application.

12. The non-transitory computer program product of claim 10, wherein each subroutine of the plurality of subroutines is a function call within a computer program.

13. The non-transitory computer program product of claim 9, wherein the operations further comprise receiving the computing thread prior to the determining that the sample indicates the particular subroutine that is not serviced by the central processing unit.

14. The non-transitory computer program product of claim 9, wherein the report comprises the particular subroutine, an identification of the prior subroutine, and a total number of samples for which time periods associated with the central processing unit are recorded in stack frames of prior samples.

15. A system comprising:
a call stack including a plurality of stack frames associated with a plurality of samples associated with a computing thread characterizing a portion of a plurality of subroutines;
at least one processor to determine that a sample of the plurality of samples indicates a particular subroutine of the plurality of subroutines that is not being serviced for a particular time period by a central processing unit operatively coupled to the at least one processor, the at least one processor configured to record the particular time period in a stack frame of the plurality of stack frames that is specific to a prior sample of the plurality of samples, the prior sample indicating a prior subroutine of the plurality of subroutines that was serviced by the central processing unit, the at least one processor configured to retrieve the particular time period from the stack frame to generate a report.

16. The system of claim 15, wherein a probability of at least one sample of the plurality of samples being taken within each subroutine of the plurality of subroutines is proportional to a time period of the subroutine.

17. The system of claim 15, wherein:
the plurality of subroutines is a part of a computer program that executes an enterprise resource planning application; and
each subroutine of the plurality of subroutines is a function call within a computer program.

18. The system of claim 15, wherein the at least one processor is configured to receive the computing thread prior to the determining that the sample indicates the particular subroutine that is not serviced by the central processing unit.

19. The system of claim 15, wherein the report comprises the particular subroutine, an identification of the prior subroutine, and a total number of samples for which time periods associated with the central processing unit are recorded in stack frames of prior samples.

20. The system of claim 15, wherein the at least one processor is configured to display the report on a graphical user interface.

* * * * *